United States Patent [19]

Hertel et al.

[11] 3,818,188

[45] June 18, 1974

[54] DEVICE FOR POSITIONING A DATA CARRIER IN A READING APPARATUS

[75] Inventors: Gunther Hertel, Hamburg; Ralf Ehrke, Eppenhain, both of Germany

[73] Assignee: U.S. Philips Corporation, New York, N.Y.

[22] Filed: May 4, 1972

[21] Appl. No.: 250,346

[30] Foreign Application Priority Data

Oct. 26, 1971 Germany .......................... 2153214

[52] U.S. Cl. .......................................... 235/61.11 R

[51] Int. Cl. .......................................... G06j 19/04

[58] Field of Search ........ 235/61.11 R; 40/334, 335, 40/68.6; 116/133, 121

[56] References Cited

UNITED STATES PATENTS

| | | | |
|---|---|---|---|
| 3,343,292 | 9/1967 | Jorgensen | 40/334 |
| 3,526,125 | 9/1970 | Gilford et al. | 235/61.11 |
| 3,680,967 | 8/1972 | Engelhardt | 235/61.11 |

*Primary Examiner*—Paul J. Henon
*Assistant Examiner*—Joseph M Thesz, Jr.
*Attorney, Agent, or Firm*—Frank R. Trifari

[57] ABSTRACT

A device for positioning a data carrier in a reading apparatus, the data carrier being attached, for example, to a test tube by means of a coupling element. The coupling element can be positioned in a holder in the form of a sleeve provided with inner guides.

9 Claims, 5 Drawing Figures

DEVICE FOR POSITIONING A DATA CARRIER IN A READING APPARATUS

Figure 1:
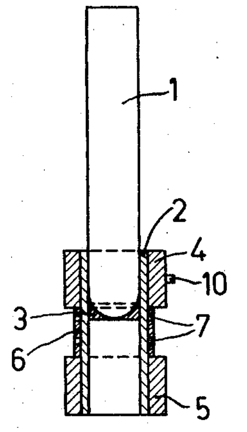

The invention relates to a device for positioning a data carrier in a reading apparatus in a predetermined position, comprising a coupling element to which the data carrier can be attached and a holder in which the coupling element can be positioned during reading.

A general need exists for a device of this kind if a large number of similarly shaped data carriers, each of which is secured to another object, is to be applied quickly and without errors to a reading apparatus. For example, in medical mass examinations a large number of test tubes must be provided with data as regards the relevant patient and the result of the relevant examination, it being necessary that said data are provided such that subsequently they can be mechanically processed.

The invention has for its object not only to couple a data carrier to an object such as a test tube, but also to provide a construction of the assembly such that the data carrier can be processed in a fully automatic reading device.

To this end, the device according to the invention is characterized in that the holder consists of a sleeve which is cylindrical over at least a portion of its length, the wall of said sleeve comprising an aperture which serves as a reading window, the inner surface of the sleeve being provided with guide grooves, the coupling element having at least one guide ring which fits in the sleeve, said guide ring being provided with a cam which fits in the guide grooves such that the cam is automatically guided to a rest position when the coupling element is inserted in the holder, the desired portion of the data carrier then facing the reading window.

The coupling element preferably comprises two guide rings which are arranged one above the other. The data carrier can then be provided between the two guide rings. In that case the upper guide ring preferably accommodates the cam.

According to a variant of the device according to the invention, the rest position is formed by a vertical groove which is open at its lower side, the sleeve being provided with a removable bottom. This bottom preferably has the shape of a truncated cone, at least three bearing points being provided along the upper edge thereof, the lower end of the coupling element having a corresponding number of recesses which are adapted to the bearing points.

Thanks to the constructions described above, a data carrier can be coupled to an arbitrary object by means of a suitable coupling element. The data carrier can be read without errors since the coupling element always fits in the associated holder in the correct position.

Figure 2A:
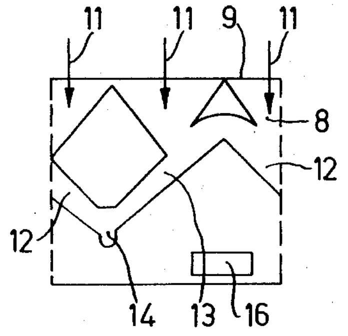
Figure 2B:
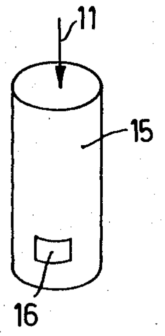
Figure 3A:
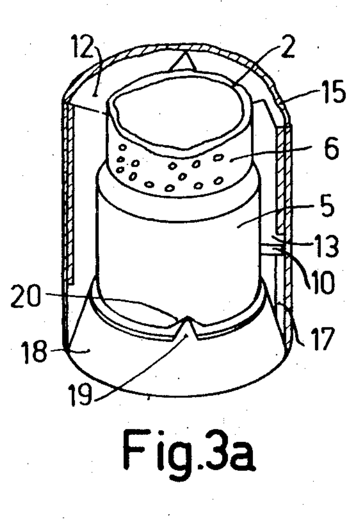

The invention will be described in detail with reference to the drawing. Therein:

FIG. 1 is a longitudinal sectional view of a coupling element, attached to a test tube, for a device according to the invention, FIG. 2*a* shows a holder for a device according to the invention in the form of a cylindrical sleeve, as a developed view so as to expose the inner surface, and FIG. 2*b* is a perspective view of the same holder, FIGS. 3*a* and *b* are a perspective sectional view of another embodiment of the device according to the invention and a developed view of the associated holder, respectively.

FIG. 1 shows a cylindrical test tube 1 to which a coupling element 2 is attached. Provided on the inner wall of the coupling element 2 is an inward projecting ring 3 which determines how far the test tube 1 can be slid into the coupling element 2. Provided on the cylindrical coupling element 2 are an upper guide ring 4 and a lower guide ring 5. These guide rings 4 and 5 may be made of different material. However, it is alternatively possible that they form one assembly with the coupling element 2. Provided on the outer jacket of the coupling element 2, between the two guide rings 4 and 5, is an data carrier 6, in this case in the form of a punched tape made of, for example, paper of a synthetic resin material. The data carrier 6 is held in a predetermined position on the outer jacket of the coupling element 2 by means of two fixing pins 7 such that it cannot be moved.

The coupling element 2 is accommodated by a cylindrical sleeve 15, the inner surface of which is shown in a developed view in FIG. 2*a*. The wall of the sleeve 15 is denoted by the reference numeral 8, the end of the sleeve in which the coupling element can be inserted being denoted by 9. Provided on the inner surface of the sleeve 15 are projections between which grooves 12 and 13 extend which join in a rest position 14. In a vertical position of the sleeve 15, a cam 10 provided on the upper guide ring 4 (FIG. 1) can be placed in the sleeve in the direction of the arrow 11, where it will always reach one of the guide grooves 12 or 13, the cam ultimately reaching the final position at the lowest point of the guide grooves 12 and 13, i.e., the rest position 14.

FIG. 2*b* is a perspective view of the sleeve 15 in which the coupling element 2 can be inserted from above in the direction of the arrow 11, the coupling element being forced to rotate about its own axis by the guide grooves 12 and 13 until the cam 10 assumes its final position in the rest position 14, the portion of the data carrier 6 which is to be read then facing exactly a reading window 16 in the wall of the sleeve 15.

Figure 3B:
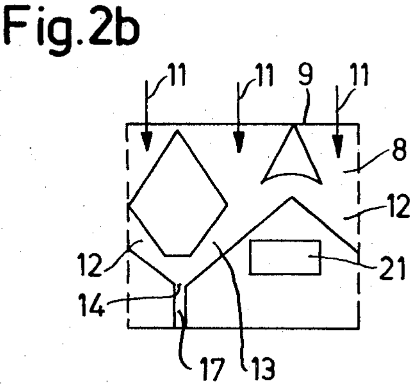

FIG. 3 shows a special embodiment of a device according to the invention. The sleeve 15 for accommodating the coupling element 2 is again provided with the guide grooves 12 and 13 (see FIG. 3*b*); in FIG. 3*a* it is shown in a position where the cam 10 is in the rest position 14. The reading window, denoted in FIG. 3*b* by the reference 21, is not visible in FIG. 3*a*. In this case it is situated above the rest position 14, whilst in the embodiment shown in FIG. 2 it is situated therebelow. FIG. 3*a* clearly shows the data carrier 6 in which the information is provided in the form of a perforation. Furthermore, in the embodiment shown in FIG. 3*a* the cam 10 is provided on the lower guide ring 5. In this case, the cam 10 determines the correct position of the coupling element 2 with respect to the reading window 21 only in the circumferential direction. This position is not determined by the cam 10 in the vertical direction, as the rest position 14 is formed by a vertical groove 17 which is open at its lower side. In this case, the coupling element 2 is arrested in the vertical direction in that the sleeve 15 is provided with a bottom 18 which has the shape of a truncated cone, three or more bearing points 19 being provided along the circumference of the said cone, it being possible for said bearing points to cooperate with a corresponding number of recesses 20 provided on the lower end of the coupling element 2. The angle enclosed by the recess 20 is larger than the angle enclosed by the edges of the bearing points 19. After the data carrier 6 has been read, the bottom 18 can in this case be removed in the downward direction after which the coupling element 2, together with the test tube 1, is ejected from the sleeve 15, the sleeve then being ready for use again.

What is claimed is:

1. Test tube handling apparatus, comprising:

a test tube holder for receiving a test tube, said holder having an identifiable outside surface region for carrying test tube identification indicia;

a sleeve for receiving said holder, said sleeve having a window for viewing said surface region of said holder; and means inside said sleeve for engaging said holder to automatically rotate and guide said holder as said holder is being received by said sleeve into a predetermined and fixed rest position at which position said surface region of said holder faces said window, whereby identification indicia carried on said surface region of said holder may be viewed from outside said sleeve through said window.

2. Test tube handling apparatus as claimed in claim 1, wherein said sleeve for guiding said holder comprises a cam and a cam guide groove, one being fixed to said holder and the other being fixed to said sleeve for cooperation with each other to guide said holder when inserted within said sleeve to said predetermined rest position.

3. Test tube handling apparatus as claimed in claim 2, wherein the interior surface of said sleeve over the most part and the exterior surface of said holder over the most part are cylindrically shaped with the inside diameter of said sleeve being slightly larger than the outside diameter of said holder, such that said holder fits within said sleeve.

4. Test tube handling apparatus as claimed in claim 3, wherein the interior surface of said sleeve is further characterized by at least one cam guide groove and the exterior surface of said holder is further characterized by at least one protruding cam which fits within said at least one groove when said holder is inserted within said sleeve to guide said holder to a predetermined rotary position.

5. Test tube handling apparatus as claimed in claim 4 wherein the exterior surface of said holder contacting the interior surface of said sleeve comprises two spaced cylindrical guide rings, said identifiable outside surface region for carrying test tube identification indicia being located between said rings, and said cam protruding from one of said rings.

6. Test tube handling apparatus as claimed in claim 5, wherein said at least one cam guide groove comprises at least one cam receiving channel which is open and wide at one end of said sleeve for receiving said cam from virtually any radial position and which narrows in the direction of the other end of said sleeve to guide said cam toward a predetermined rotary position.

7. Test tube handling apparatus as claimed in claim 6 wherein said at least one cam receiving channel comprises at least two such channels which receive said cam from different radial sectors, each channel narrowing in the direction of said other end of said sleeve and joining into one channel, thereby guiding said cam toward said predetermined rotary position from any of said radial sectors.

8. Test tube handling apparatus as claimed in claim 7 wherein said one channel is open at said other end of said sleeve and said sleeve further includes a detachable end member to stop said holder in said sleeve at a predetermined axial position and to permit said holder to be removed from said other end of said sleeve by first detaching said end member therefrom.

9. Test tube handling apparatus as claimed in claim 8 further characterized by at least one tapered bearing point and at least one bearing point receiving recess of greater taper, one of which being fixed to the inside surface of said detachable end member and the other being fixed to the end of said holder, whereby said at least one bearing point fits into said at least one bearing point receiving recess to stop said holder in said sleeve at a predetermined axial position, the tapering of said at least one bearing point and bearing point receiving recess urging said holder to a precise radial position as well.

* * * * *